United States Patent [19]

Zonkov et al.

[11] 3,989,260

[45] Nov. 2, 1976

[54] SECTIONAL TOOL UNIT, PARTICULARLY FOR TOOLS WITH A CYLINDRICAL SHANK

[75] Inventors: Simeon Dontchev Zonkov; Alexander Yordanov Zarvenkov; Konstantin Kirilov Tchobanov; Nikolay Vassilev Baliev, all of Sofia, Bulgaria

[73] Assignee: DSO "ZMM", Sofia, Bulgaria

[22] Filed: Oct. 4, 1974

[21] Appl. No.: 512,125

[30] Foreign Application Priority Data

Feb. 9, 1973   Bulgaria.................................. 22683

[52] U.S. Cl................................... 279/4; 279/1 ME; 408/240
[51] Int. Cl.²......................................... B23B 31/30
[58] Field of Search..................... 408/238, 239, 240; 279/3, 4, 2 R, 102, 103, 95, 96

[56] References Cited

UNITED STATES PATENTS

| | | | |
|---|---|---|---|
| 2,942,891 | 6/1960 | Zale.................................... | 279/4 X |
| 2,963,298 | 12/1960 | Better et al............................. | 279/4 |
| 3,516,681 | 6/1970 | Cox et al. ............................... | 279/4 |
| 3,592,482 | 7/1971 | Better et al............................. | 279/4 |

FOREIGN PATENTS OR APPLICATIONS

| | | | |
|---|---|---|---|
| 712,754 | 7/1965 | Canada................................... | 279/4 |

OTHER PUBLICATIONS

IBM Technical Disclosure Bulletin, vol. 10, No. 9, Feb. 1968, Tool Holder Ass'y. J. A. Ditson.

*Primary Examiner*—J. M. Meister
*Assistant Examiner*—W. R. Briggs

[57] ABSTRACT

Tool holder for use with machine tools, the tool holder having two aligned cylindrical bores of different diameters, separated by a circumferential groove, which is in communication with a hole through the body of the tool holder through which hydraulic fluid can be supplied. The cylindrical shank of the tool has correspondingly two cylindrical surfaces of different diameters with conical shoulders, one of which is in the end of the shank, while the other connects the cylindrical surfaces. The relaxed diameters of both stepped holes in the tool holder are smaller than the diameters of both cylindrical surfaces of the cylindrical shaft of the tool, the tool shank being press fitted into the tool holder. The advantages of the sectional tool unit according to the present invention are that the need of fastening elements is eliminated, while the mounting surfaces of the tool shank and the tool holder are very effectively engaged and can be machined with a high precision which determines the precision of the tool unit as a whole.

The invention also relates to the methods of assembly and disassembly of the tool and tool holder.

3 Claims, 3 Drawing Figures

SECTIONAL TOOL UNIT, PARTICULARLY FOR TOOLS WITH A CYLINDRICAL SHANK

This invention relates to a sectional tool unit and, in particular a tool holder for tools with a cylindrical shank, used mainly in machine tools. Different designs of sectional tool units for tools with a cylindrical shank are known. These can be divided into three types.

I. In the first type of sectional tool units the cylindrical shank of the tool is mounted in the corresponding hole of the tool holder, while its fastening is effected by means of radial screws which are screwed into the embracing spindle of the holder and act upon the tapered part of the cylindrical shank of the tool. A disadvantage of this type of sectional tool unit is the low stability resulting from the fastening with radial screws in a narrow strip of the shank of the tool. Moreover, in this type of tool unit there appear wedging forces caused by the transmission of the torque, which make it difficult to unscrew the radial screws in disassembling to tool from the tool holder.

II. In the second type of sectional tool unit the cylindrical shank of the tool, with a key attached to it, is mounted in the corresponding hole with a key (slot) in the tool holder. The fastening is effected by means of radial screws screwed into the embracing part of the body of the tool holder such screws acting on the tapered part of the tool shank, while the transmission of the torque is effected by the key joint. The tool unit is adjusted axially by means of a nut screwed on in the front end of the tool shank and engaging the front face of the tool holder. The disadvantage of this type of sectional tool unit is the comparatively large number of component parts, which complicate the design as well as the low stability of the joint between the tool and tool holder.

III. In the third type of sectional tool unit, the cylindrical shank of the tool is mounted in a corresponding hole in the tool holder, while the torque is transmitted by means of a key joint between both elements. The fastening is effected along the axis of the tool unit by screwing the pulling screw in the tool shank, while simultaneously elastically deforming a spring element acting between the face of the pulling screw and a support, disposed in the hole of the holder, into which the aforementioned elements, provided to effect the fastening, are mounted. Thus, a prestressed joint between the holder and the tool is achieved which provides a greater stability than that of the first two types of tool units. Here the axial adjustment of the tool is effected in the same manner as in the second type of tool unit. The disadvantage of the third type of sectional tool unit is the comparatively large number of component parts, which complicate the design and reduce the effectiveness of its production.

It is therefore a general object of the invention to avoid the aforementioned disadvantages of the known designs and to provide a sectional tool unit, in which the tool holder is provided with two stepped holes into which there enter two cylindrical stepped surfaces of the tool shank upon hydraulic adjustment of the tool holder.

According to the invention this object is achieved by the use of a tool holder with two cylindrical stepped holes of different diameters separated by a circumferential groove, connected with a hole through the body of the tool holder, while the cylindrical shank of the tool has correspondingly two cylindrical stepped surfaces of different diameters and two conical shoulder surfaces, one of which is in the end of the shank, while the other connects the cylindrical stepped surfaces, and the relaxed diameters of both stepped holes in the tool holder are smaller than the diameters of both cylindrical stepped surfaces of the cylindrical shaft of the tool. The tool shank is press fitted into the tool holder.

The advantages of the sectional tool unit according to the present invention are that the need of fastening elements is eliminated, and the mounting surfaces of the tool holder and the tool are technologically effective and can be machined with a sufficiently high precision, which determines the precision of the tool unit as a whole.

A further advantage of the sectional tool unit is that by means of hydraulic adjustment of the tool holder a joint of such tightness is achieved that it is equal in stability to an integral tool unit, such unit however, having the advantage that it is sectional and can be disassembled.

For a better understanding of the invention, reference should be made to the accompanying drawings in which there is illustrated a preferred embodiment of a sectional tool unit, particularly for tools with a cylindrical shank, and there are described its design, as well as its assembly and disassembly.

Figure 1:
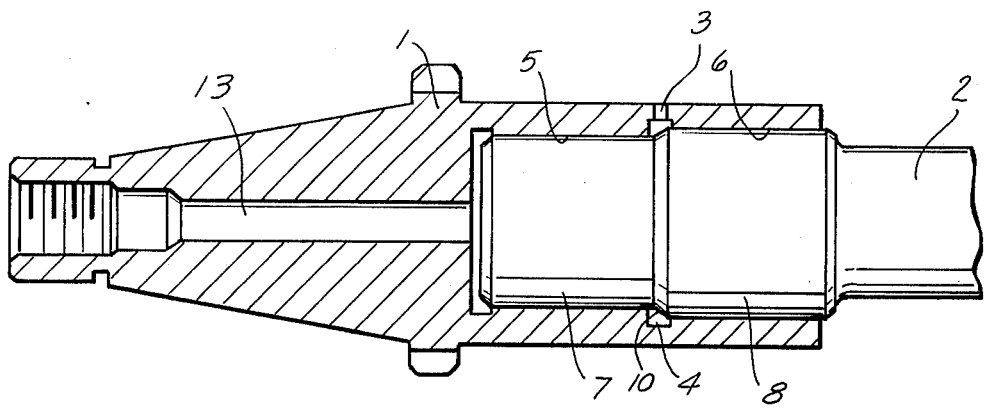
FIG. 1 is a view partially in longitudinal axial section and partially in elevation of the sectional tool unit in an assembled state.
Figure 2:
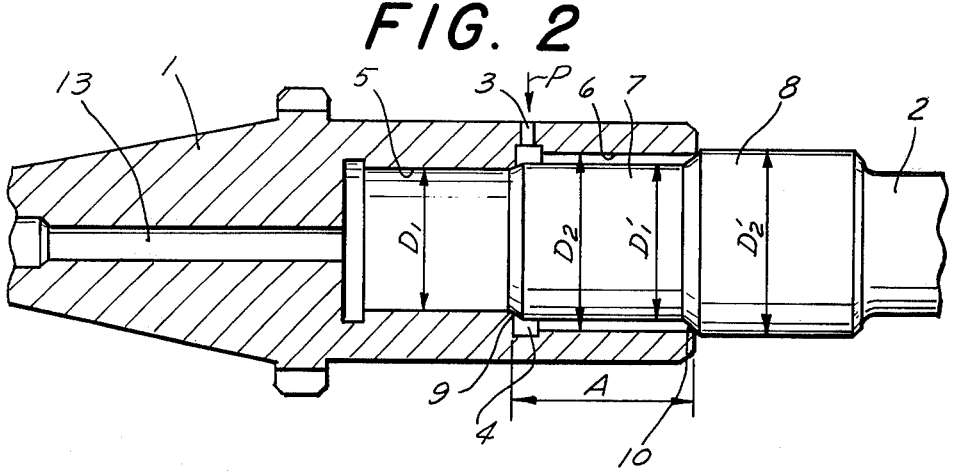
FIG. 2 is a similar view showing the initial state of assembly of the tool with the tool holder.

Turning now to FIG. 1, the tool holder has an axial bore 13 and two cylindrical stepped surfaces 5 and 6 separated by a circumferential groove 4, which is connected with a radial hole 3 through the body of the tool holder (as shown in FIG. 2) The tool holder embraces both cylindrical stepped surfaces 7 and 8 of the cylindrical shank of the tool 2, which in its front end has a conical surface 9 and in the central part a conical shoulder 10, connecting the cylindrical stepped surfaces 7 and 8.

Figure 3:
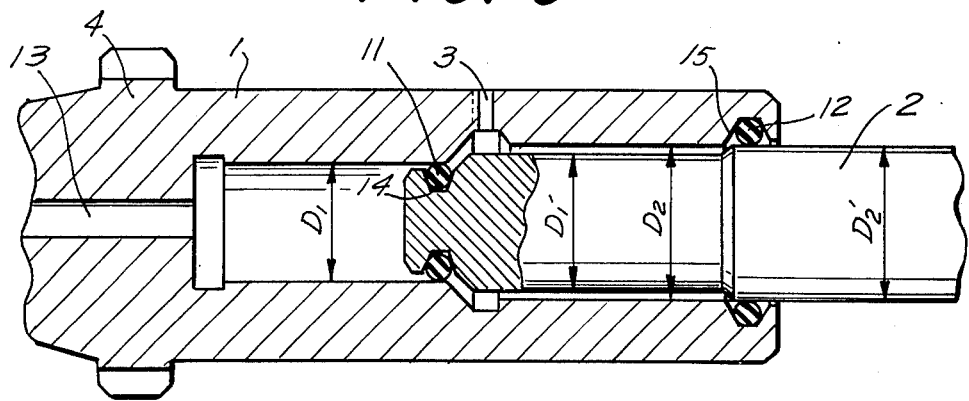
FIG. 3 is a fragmentary view partially in longitudinal axial section and partially in elevation of a section tool unit with sealing rings.

The sectional tool unit shown in FIG. 3 is provided with sealing rings 11 and 12, disposed respectively in the groove 14, which is machined in the end of the cylindrical shank of the tool 2, and in the inner groove 15, which is machined in the end of the tool holder 1. It is an advantage of the design version shown in FIG. 3 that it is not necessary that the length A of the cylindrical hole 6 in the tool holder 1 and the distance between the conical surfaces 9 and 10 of the cylindrical shank of the tool 2 be highly accurate, since it is always possible to provide a chamber between the sealing rings 11 and 12 and the cylindrical surfaces 6 and 7. The relaxed diameters $D_1$ and $D_2$ of cylindrical stepped holes 5 and 6, respectively, in the tool holder 1 are smaller than the corresponding diameters $D_1$ and $D_2$ of the cylindrical shank of the tool 2. They are constructed similarly to the existing detachable joints having interference fits, the parts of which are assembled by means of a press. The difference in the relaxed diameters correspond to the desired degree of interference between the tool holder 1 and the cylindrical shank of the tool 2, depends on the type of operation for which tool is to be used.

The assembly of the tool holder with the tool is effected as follows: The cylindrical shank of the tool 2 is inserted into the tool holder 1 of the tool unit, as shown in FIG. 2. A liquid under pressure P is delivered through the hole 3. By means of the circumferential groove 4, such pressure liquid is distributed in the space formed by the cylindrical hole 6, the cylindrical surface 7 and the conical surfaces 9 and 10. As a result of the pressure, the cylindrical holes 5 and 6 are elastically increased in their diameters $D_1$ and $D_2$ to such sizes that the cylindrical stepped surfaces 7 and 8 with diameters $D_1'$ and $D_2'$ enter into the tool holder 1 by applying a minimum force along its axis. The air enclosed in the space between the bottom of the cylindrical hole 5 and the face of the cylindrical surface 7 is not pressurized when the cylindrical shank of the tool 2 enters into the tool holder 1 because of the availability of the central hole 13, which provides a connection with the atmosphere. After fitting the cylindrical shank of the tool 2 in the tool holder 1 to the desired depth, the action of the pressure liquid is stopped. As a result of the elastic deformation of the parts, the tool holder 1 embraces the shank of the tool 2 with a force corresponding to the interference between their diameters.

The disassembly of the tool unit is effected in the reverse sequence. A liquid under pressure P is delivered through the hole 3; it is distributed in the circumferential groove 4 and deforms elastically the cylindrical boxes 5 and 6 of the tool holder 1. As a result of this, well as of the arising of a resultant force, due to the difference in the diameters $D_1'$ and $D_2'$ of the cylindrical surfaces 7 and 8 of the shank of the tool 2 which act in the direction of extracting the tool from the tool holder, it is possible to disassemble the tool unit by applying a minimum additional pulling force in the last stage of disassembly.

The sectional tool unit for tools with a cylindrical shank, in accordance with the present invention, can be applied in machine tool with programmed control, in machines of the working center type, as well as in general purpose machine tools and metalworking machines. Its application is particularly effective in jig-boring tools with one cutting edge, where the indicated advantages of the sectional tool unit are of decisive importance for the precision of machining.

It will be understood that in the embodiment of FIGS. 1 and 2 a hydraulic seal is established when the parts are in the position of FIG. 2. In such position, the frusto-conical shoulder 9 sealingly engages the right hand edge of the portion 5 of the bore in the tool holder, and the frusto-conical shoulder 10 sealingly engages the right hand end of the portion 6 of the bore in the tool holder. Such sealing engagements are continued as the tool shank is trust into the bore in the tool holder, because of the interference fits between the bore parts 5 and 6 and the corresponding cylindrical parts 7 and 8 on the tool shank. Such seals are effective during the thrusting of the parts 6 and 7 into the tool shoulder, despite the described expansion of the bore parts 5 and 6 by the hydraulic pressure of the fluid admitted through passage 3, when the tool shank is fully inserted in the tool holder, and during the withdrawal of the tool shank from the tool holder during the disassembly of the tool and tool holder.

In the embodiment of FIG. 3 the different diametered bore parts in the tool holder and the different diametered cylindrical parts on the tool shank have the same relationship and interact in the same manner as the corresponding parts in FIGS. 1 and 2. The sealing members 11 and 12 funtion to supplement the interference fits between the parts to minimize the leakage of hydraulic fluid, particularly, and the beginning of the insertion of the tool shank into the bore in the tool holder, and at the end of the operation of withdrawing the tool shank from the tool holder.

Although the position of the parts shown in FIG. 1 has been spoken of above as the "fully assembled position", it is to be understood that it may be desired to regulate the general length of the combined tool holder and tool by telescoping them to an extent somewhat short of that shown in the figure. For this purpose it has been found satisfactory if the tool 2 is advanced to the left from the position of FIG. 2 through a distance of A/2 or more.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A sectional tool unit for machine tools, said unit comprising a tool with a shank which is a body of revolution, and a tool holder having a passage therein which matingly receives said shank with an interference fit, the passage in the tool holder being formed of two aligned cylindrical bores of different diameters separated by a circumferential groove, the groove and the two cylindrical bores in the tool holder being connected to the exterior of the tool holder body by a passage extending through said body, the shank of the tool having an external surface formed of two aligned cylindrical surfaces of different diameters and two frustoconical surfaces one of which is disposed at the outer end of the tool shank, while the other connects the two circular cylindrical surfaces of the shank, the relaxed diameters of the tool bores in the tool holder being slightly smaller than the diameters of the respective cylindrical surfaces on the shank of the tool, the shank of the tool being press fitted into the passage in the tool holder.

2. A sectional tool unit according to claim 1, wherein the diameter of the cylindrical surface adjacent to the outer end of the tool shank is less than the diameter of the other cylindrical surfaces on such shank.

3. A sectional tool unit according to claim 1, comprising an annular groove in the outer end of the tool shank, and a second annular groove in the outer end of the tool shank receiving passage in the tool holder, and a resilient sealing ring mounted in each of said annular grooves.

* * * * *